July 8, 1969
P. MUNDT
3,453,823
CHAIN MADE FROM MOLDABLE MATERIAL
Filed Dec. 31, 1964
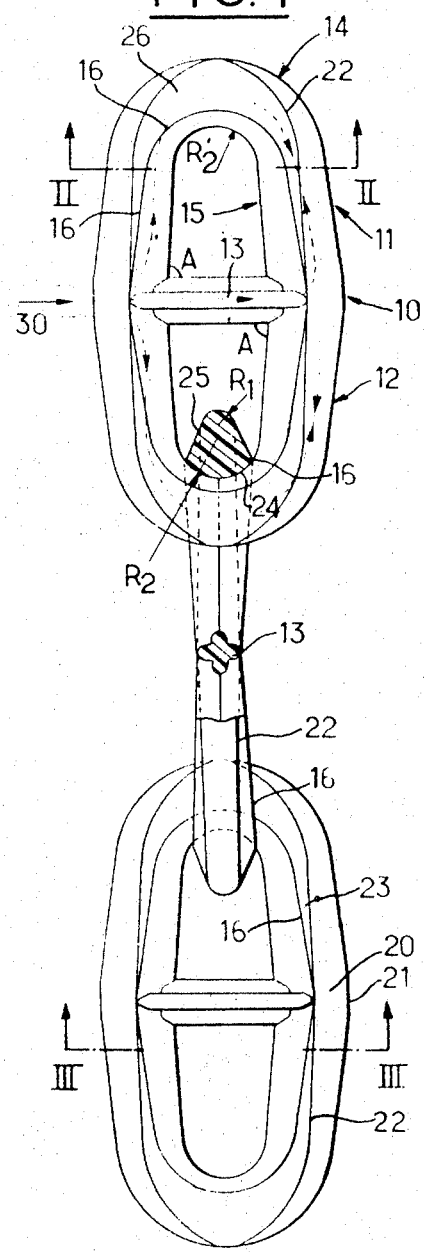
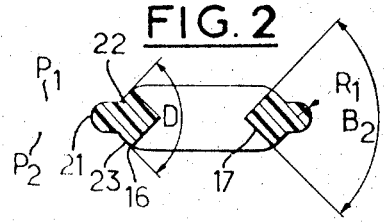
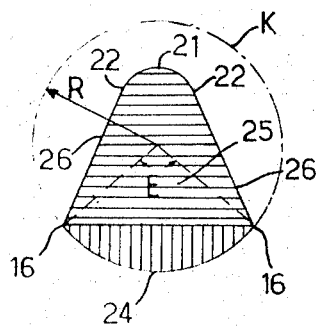
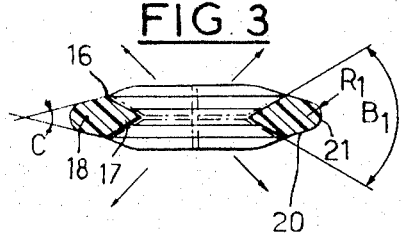
Inventor
Peter Mundt
By Stevens, Davis, Miller & Mosher
Attorneys.

United States Patent Office 3,453,823
Patented July 8, 1969

3,453,823
CHAIN MADE FROM MOLDABLE MATERIAL
Peter Mundt, Munchner Strasse 12,
Garmisch-Partenkirchen, Germany
Filed Dec. 31, 1964, Ser. No. 422,687
Claims priority, application France, Jan. 7, 1964,
959,503
Int. Cl. F16g *13/06, 13/08*
U.S. Cl. 59—90                          10 Claims

ABSTRACT OF THE DISCLOSURE

The disclosure relates to the manufacture of chains and to a design for chain links where the chains are composed of an injection molded material, such as thermoplastic material. The profile of the links vary throughout the link and which profile includes an inner portion of generally V-shape except for the arcuate portions of the link which are designed on the radius of a circle. The outer portion of each link has a profile to define a peripheral flange.

---

This invention relates to a chain made from moldable material, particularly an injection-molded chain made from thermoplastic material, which chain comprises links having mirror symmetry with respect to a central plane and consisting each of two pairs of substantially straight legs and two arcuate portions connecting the legs of each pair, said chain links having a cross-section which is generally wider in the plane of the chain link than in the plane at right angles thereto, and said arcuate portions having at the load-transmitting surface a cross-section which corresponds generally to a segment of a circle and conforms to the adjoining portion of the next adjacent chain link. Chains embodying these features have previously been known as metal chains for heavy loads.

The known chains of plastics material are not satisfactory for a transmission of substantial forces because an attempt to increase the cross-section of the chain links in order to obtain a sufficient tensile strength will soon reach a limit, above which there is a danger of a formation of contraction cavities in the material during its solidification and cooling in the mold. Such contraction cavities may form at any point of the chain link and reduce the strength which has been obtained by the increase of the cross-section. Another cause of difficulties is the fact that the increase of the loads to be supported by the chain results in an excessive rise of the contact pressure because the load is transmitted by very small or even punctiform contact surfaces between successive chain links.

Thus, the present invention has two main objects, namely, to increase the width of the effective contact surface between any two successive links of the chain and to design a cross-section which minimizes the formation of contraction cavities in the material. In a chain of the type described first hereinbefore and made from castable material, these objects are accomplished in that the outer portion of the cross-section is defined beyond the chord of the segment of a circle by a conic section. The cross-section according to the invention opposes a formation of contraction cavities in the outer portion of the cross-section and affords an increase in the width of the contact surface and a corresponding decrease of the pressure per unit of area. Hence, the practice of the invention results in a substantial increase of the load which can be transmitted by a chain made from a given material.

This cross-section according to the invention is prescribed only for the arcuate members. In relatively small chain links, the legs may also be designed with such a cross-section. Particularly in the case of chain links to be subjected to relatively high loads, however, it is more desirable according to a further feature of the invention to design the arcuate portion in a plane at right angles to the plane of the chain link with a cross-section in the general form of a segment of a circle having a chord which has a length exceeding the width of the legs. The meaning of this definition is most clearly apparent from the intermediate chain link shown in FIG. 1. According to the prior art, the side faces of the chain links are flat and parallel to each other. According to the said further feature of the invention, the width of the chain link is increased only at the contact surface whereas its width and height are reduced in other portions, particularly on the level of the cross-strut, in order to further oppose a formation of contraction cavities.

Tests which have been carried out have shown that plastics material chains according to the invention are highly superior to all plastics material chains on the market as regards load capacity and wear resistance. Besides, the invention is an important contribution to the art of manufacturing the chain links because the chain links according to the invention may be made in a continuous process resulting in the formation of a chain.

Further features and advantages of the invention will be explained by way of example hereinafter with reference to an embodiment shown in the drawing.

FIG. 1 is a fragmentary view showing a chain with three chain links according to the invention.

FIG. 2 is a sectional view taken on line II—II in FIG. 1.

FIG. 3 is a sectional view taken on line III—III in FIG. 1.

FIG. 4 is a detail view illustrating the cross-section of the arcuate portion.

In the selected embodiment shown in the drawing, each chain link 10 is composed of two arches 11, 12, which are symmetrically designed on both sides of a connecting cross-strut 13, which has a cruciform cross-section. Each of the arches 11, 12 has an arcuate portion 14, which conforms to an arc of a circle and is continued by two substantially straight legs 15.

The opposite legs of the two arches meet at the ends of the cross-strut 13 and include with the latter an angle A, which is slightly less than 90°, e.g., 85°. As is apparent from the showing of the intermediate chain link shown in section and partly broken away in FIG. 1, the leg is slightly tapered in cross-section from the end at the arcuate portion 14 toward the inner end, where it adjoins the cross-strut 13. This cross-section (FIGS. 2, 3) is composed of an inner portion 17 and an outer portion 18. These portions 17 and 18 are disposed on opposite sides of two ridges 16. The inner portion 17 is V-shaped. The angle included by the two sides of this inner portion increases continuously from an initial value B1 of about 60°, e.g., at the inner end (FIG. 3) to a final value B2 (FIG. 2) at the outer end of the leg. This final value B2 does not exceed 90°. At the inner end of the leg, the outer portion 18 has a rounded V-shaped cross-section, which is defined by two sides 20, which include an initial angle C, e.g., of about 30°, and an arcuately rounded outer edge 21 having a radius of curvature R1. This rounded edge extends around the chain link. This edge has a virtually constant radius of curvature around the entire outer periphery of a peripheral flange defined by the two parallel planes P1, P2 (FIG. 2). This results in a transitional inner curve 22 on each side of the chain link. On the inside of this curve, the outer portion of the cross section of the leg is defined by two sides 23, which increase in width continuously from the inner end to the outer end of the legs. As a result, this transitional curve joins the ridge 16 and an angle D of approximately 90° is formed.

The sectional plane II—II may be considered as the transitional plane between the legs 15 and the arcuate portions 14. The arcuate portion disposed beyond this plane has a cross-section (FIG. 4), which comprises on opposite sides of the ridges 16 an inner portion defined by an arc of a circle 24 having the radius R2, and an outer portion resulting from the transition from the peripheral flange 21 to the ridges 16. This transition is afforded by the two side faces 26, which are extensions of the side faces 23 of the legs.

The drawing shows also that in an end view the arcuate portion is defined on the inside by an almost complete semicircle having a radius of curvature R2', which is equal to the radius of curvature R2. The latter has been defined hereinbefore as the radius of curvature of the inner cross-sectional portion of this arcuate portion. The ridge 16 and the peripheral edge 21 are shaped according to arcs of concentric circles.

In other words, the arcuate portion forms a portion of a circular ring having the inside radius R2' and a cross-section defined on the inside by the radius R2, which is equal to the radius R2'. This design is of great practical significance because it results in the formation of an enlarged and continuous surface for the transmission of forces between two successive links of the stressed chain. As the center angle E of the arc 24 has an order of 100°, which is about twice the center angle of an arc length equal to the radius, the length of the contact arc is about 2R or twice the radius of curvature if R is the common value of the radii of curvature R2 and R2'. Thus, the extent of the saddle-shaped contact surface between the two interconnected toroidal portions of the two successive chain links can be compared to that of an imaginary circle K (FIG. 4) having the radius R, which from the geometric aspect is the inside radius of the arcuate portion.

More generally, equivalent results may be obtained with designs which depart from a circular form. It is sufficient if the arc defining the cross-section of the arcuate portion conforms to the inside of the part-toroidal arcuate portion.

In any case, the resulting cross-section of the arcuate portion is excellently suitable for an optimum transmission of tensile forces from one chain link to the succeeding one. Inasmuch as the cross-section of the contact surface approximates a circular form, it is not desirable with a view to the object to avoid a formation of contraction cavities in the material during the solidification and cooling. For this reason, this cross-sectional form is restricted according to the invention to the arcuate portion of each arch. In the legs, the cross-section is modified and departs further from the circular form immediately by assuming into a V-shape on the inside and increasing in height progressively toward the inner end of the leg or the center of the chain link.

This increase in the length of the cross-section opposes a formation of contraction cavities because the cooling surface is considerably increased relative to the cross-sectional area, which remains substantially constant around the entire chain link.

The cross-strut 13 opposes a bending of the two side portions of the chain link. The tension exerted on the two arcuate portions tends to cause such a bending. Thus, the cross-strut is mainly under buckling stress. For this reason, it has suitably a cruciform cross-section in order to resist such a stress, particularly because it has a transverse extent owing to its arms extending at right angles to the plane of the chain link.

This design of the chain link enables its use in injection-molded chains made by a process described in the German patent application G 37,827 X/39a², filed May 27, 1963, in the name of the assignee of this invention. This process is essentially characterized in that a mold is used which comprises four jaws, which are simultaneously closed and opened on both sides of two parting planes extending at right angles to each other. This process may be used to make the present chain links because the included angle B of the inner portion 17 of the cross-section of the V-shaped legs does not exceed 90°. With this design, the mold can be opened without difficulty by moving the four jaws simultaneously apart in four directions, which are at right angles to each other and at an angle of 45° to the parting planes. In FIG. 3, this movement is indicated by four arrows associated with the four jaws, which are shown in dash-and-dot lines. Further, the slight divergence of the legs of each arch (angle A less than 90°) provides space for those parts of the mold which are required for the simultaneous injection-molding of a second chain link.

The design which has been described meets also the special requirements of the injection-molding process. The mold cavities are preferably fed through a gate, which is disposed at the center of one side of the chain link, opposite to the cross-strut 13, as is indicated at 30 in FIG. 1. In this case, the injected material is divided into three streams. The material injected through the gate diagrammatically indicated at 30 in FIG. 1 can spread inside the mold along three paths. One path is an extension of the gate 30 and formed by the mold cavity for the cross-strut 13, which in the present case has a cruciform cross-section. The two lateral paths are formed by the mold cavities for the two arches 11 and 12. Thus, the liquid material fed through the gate 30 flows simultaneously in three different directions.

At the outlet of the central channel, the stream of material is divided into two directions so that each arch is supplied with material simultaneously from the inner end of the leg remote from the gate before this leg has been filled by the material from the leg near the gate. The two streams of material meet in an intermediate portion of the leg remote from the gate. In this portion, the material is still sufficiently fluid to form a satisfactory joint in spite of the fact that it has been cooled by contacting the mold.

I claim:

1. A chain made from moldable material, particularly an injection-molded chain made from thermoplastic material, comprising chain links having mirror symmetry with respect to a central plane, each link comprising two pairs of substantially straight legs and two arcuate portions connected together in a closed elongated loop, said link having a cross section which is generally wider in the plane of the chain link than in the plane at right angles thereto, and said arcuate portions having at the load-transmitting surface a cross section, the inner portion of which corresponds generally to a segment of a circle and conforms to the adjoining portion of the next adjacent chain link, and the outer portion of which defines a conic section, with the thickness of the arcuate portions being greater than the thickness of the leg.

2. A chain according to claim 1, characterized in that the cross-sectional area of the chain link is substantially constant throughout the periphery of the chain link.

3. A chain according to claim 2, characterized in that the legs are stiffened by a cross strut.

4. A chain according to claim 3, characterized in that the cross strut has a cross section which is enlarged along the central plane extending transversely to the link.

5. A chain according to claim 3, characterized in that the cross strut has a cruciform cross section.

6. A chain according to claim 1, characterized in that the legs of each chain link have an inner cross-sectional portion and an outer cross-sectional portion, both being substantially V-shaped but with the outer portion being rounded at the outside periphery of the legs.

7. A chain according to claim 6, characterized in that the outer cross-sectional portion comprises on one side of peripherally extending edge portions, approximately parallel side faces and a rounded edge portion and on the other side of said peripherally extending edge portions has two side faces diverging to said peripherally extending edge portions.

8. A chain according to claim 6, characterized in that the angle included by the V of the inner cross-sectional portion varies from a value substantially below 90° close to the connection of the legs to a value near but less than 90° close to the arcuate members.

9. A chain according to claim 6, characterized in that the angle included by the V of the outer cross-sectional portion is acute close to the connection of the legs and increases to about 90° close to the arches.

10. A chain according to claim 3, characterized in that the angle between the inside edges of the legs and the cross strut is not greater than 90°.

References Cited

UNITED STATES PATENTS

| 151,718 | 6/1874 | Schenck | 59—90 |
| 1,786,318 | 12/1930 | Stahl | 59—84 |
| 2,525,193 | 10/1950 | Anderson | 59—84 |

FOREIGN PATENTS

| 200,896 | 6/1908 | Germany. |
| 939,545 | 2/1956 | Germany. |

CHARLES W. LANHAM, *Primary Examiner.*

G. P. CROSBY, *Assistant Examiner.*